United States Patent
Takebayashi et al.

(10) Patent No.: US 11,535,115 B2
(45) Date of Patent: Dec. 27, 2022

(54) ELECTRIC VEHICLE CAPABLE OF PROVIDING POWER TO ANOTHER VEHICLE, METHOD FOR CONTROLLING THE SAME, AND SYSTEM

(71) Applicant: HONDA MOTOR CO., LTD., Tokyo (JP)

(72) Inventors: Ryo Takebayashi, Wako (JP); Kengo Naiki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 448 days.

(21) Appl. No.: 16/676,807

(22) Filed: Nov. 7, 2019

(65) Prior Publication Data

US 2020/0148070 A1    May 14, 2020

(30) Foreign Application Priority Data

Nov. 14, 2018  (JP) .............................. JP2018-214098

(51) Int. Cl.
  *B60L 53/66*   (2019.01)
  *B60L 53/16*   (2019.01)
  *H02J 7/34*    (2006.01)
  *H02J 7/00*    (2006.01)

(52) U.S. Cl.
  CPC ............... *B60L 53/66* (2019.02); *B60L 53/16* (2019.02); *H02J 7/342* (2020.01); *H02J 7/00045* (2020.01)

(58) Field of Classification Search
  CPC .......... B60L 53/66; B60L 53/16; B60L 53/14; B60L 53/10; B60L 53/68; H02J 7/342; H02J 7/00045; H02J 7/0048; H02J 2310/48; Y02T 10/70; Y02T 10/7072; Y02T 90/12; Y02T 90/14; Y02T 90/16
  See application file for complete search history.

(56) References Cited

U.S. PATENT DOCUMENTS

| 9,834,108 B2 | 12/2017 | Yuan |
| 9,884,562 B2 | 2/2018 | Yamamoto |
| 11,364,809 B2 | 6/2022 | Biagini et al. |
| 2016/0059720 A1 | 3/2016 | Yamamoto |

(Continued)

FOREIGN PATENT DOCUMENTS

| CN | 105142957 A | 12/2015 |
| CN | 105934864 A | 9/2016 |

(Continued)

OTHER PUBLICATIONS

Chinese Office Action for Chinese Patent Application No. 201911086059.6 dated Sep. 22, 2022 (partially translated).

*Primary Examiner* — Lincoln D Donovan
*Assistant Examiner* — Alex W Lam
(74) *Attorney, Agent, or Firm* — Thomas | Horstemeyer, LLP

(57) ABSTRACT

An electric vehicle comprises: a plurality of charging ports, at least one of which is configured to provide power to another vehicle; and at least one processor or circuit configured to function as following units: an authentication unit configured to authenticate an electronic device associated with the other vehicle using an electronic key; and a control unit configured to control, in accordance with an authentication result of the authentication unit, power provision to the other vehicle using the charging port configured to provide the power.

17 Claims, 12 Drawing Sheets

(56) References Cited

U.S. PATENT DOCUMENTS

| | | | |
|---|---|---|---|
| 2016/0288664 A1 | 10/2016 | Biagini et al. | |
| 2017/0320399 A1 | 11/2017 | Yuan | |
| 2019/0001833 A1* | 1/2019 | Coburn | B60L 53/60 |
| 2020/0101860 A1* | 4/2020 | Ichikawa | B60L 53/14 |

FOREIGN PATENT DOCUMENTS

| | | |
|---|---|---|
| CN | 107465673 A | 12/2017 |
| CN | 108790889 A | 11/2018 |
| JP | 2011024293 A | 2/2011 |
| JP | 2014-030320 A | 2/2014 |

* cited by examiner

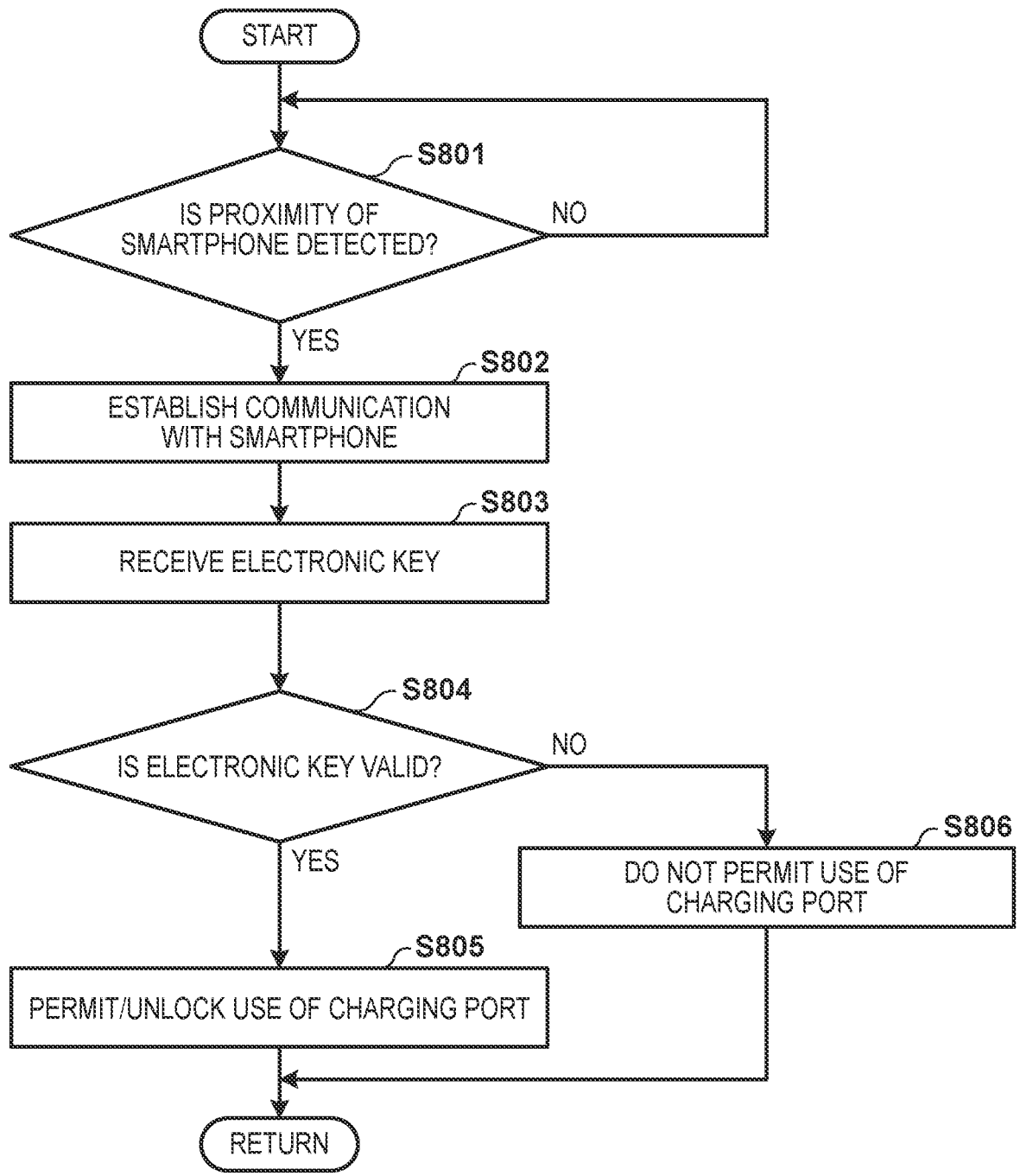

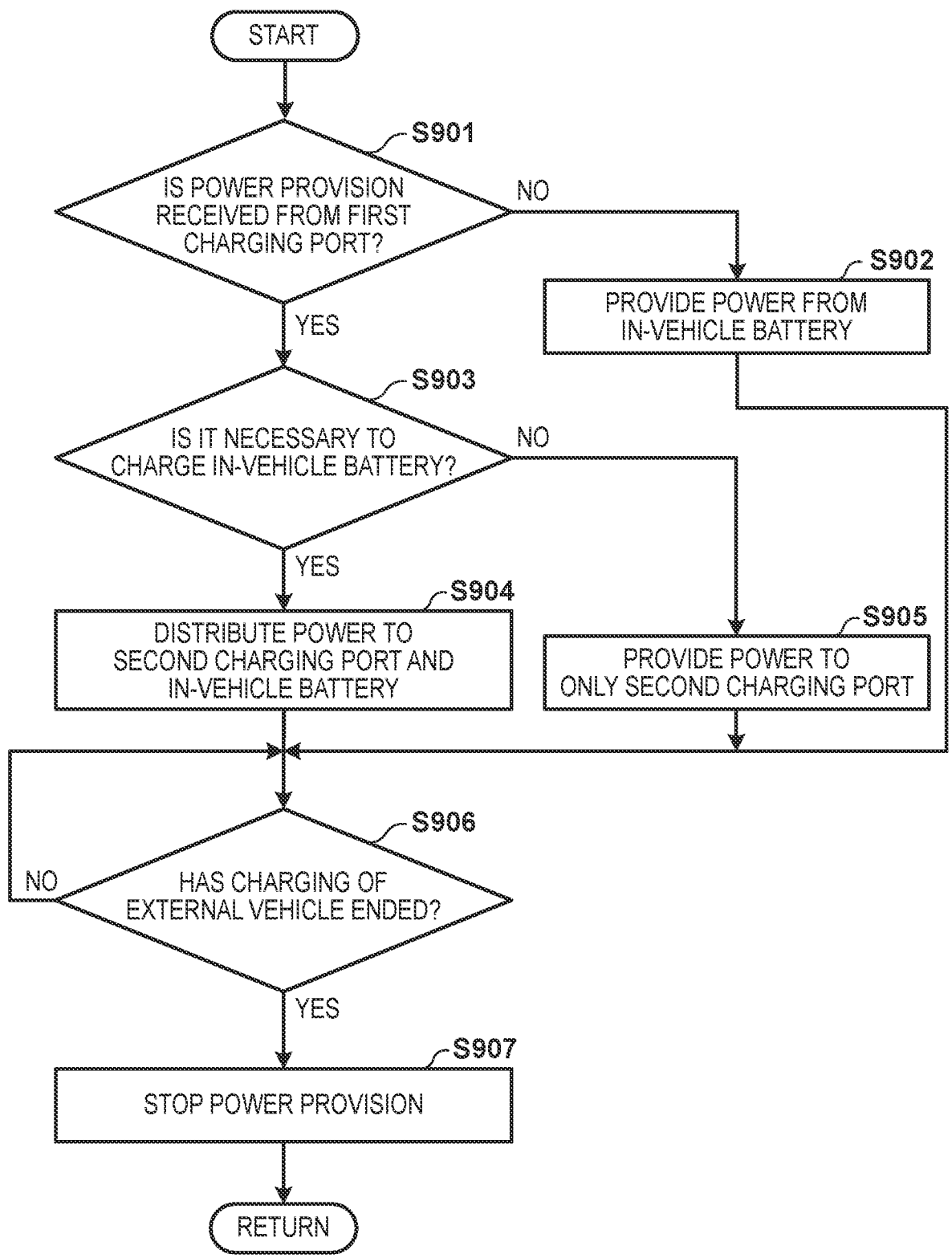

ELECTRIC VEHICLE CAPABLE OF PROVIDING POWER TO ANOTHER VEHICLE, METHOD FOR CONTROLLING THE SAME, AND SYSTEM

CROSS-REFERENCE TO RELATED APPLICATION

This application claims priority to and the benefit of Japanese Patent Application No. 2018-214098 filed on Nov. 14, 2018, the entire disclosure of which is incorporated herein by reference.

BACKGROUND OF THE INVENTION

Field of the Invention

The present invention relates to an electric vehicle capable of providing power to another vehicle, a method for controlling the same, and a system.

Description of the Related Art

There is conventionally known a charging system that charges a battery in a vehicle such as an electric car from a charger installed in a store, a public facility, or a private site. Such charging system generally connects a charging plug attached to one end of a charging cable to a vehicle stopped near the charger, and supplies a charging current from the charger to the vehicle.

Since the shape and method of a charging plug are standardized, a charger for a specific user (in, for example, a private site) may illegally be used by the third party. To solve this problem, Japanese Patent Laid-Open No. 2014-030320 proposes a system that captures an information code assigned to a vehicle, and supplies a charging current from a charger under the condition that the captured information code is decoded by the decoding unit of the charging plug.

Along with an increase in number of chargeable vehicles such as electric cars, the number of people who use a charger outside increases, and the number of chargers is insufficient in some regions. In a region where the number of chargers is insufficient, when one vehicle occupies a charger, another vehicle cannot be charged, and needs to wait until charging of the vehicle which has started charging first is completed.

There are a case in which a user who arrives at the location of a charger after a user who has started charging first wants to complete charging earlier (since, for example, he/she is in a hurry), and a case in which a person may think that he/she can provide a charging capability in a home site for charging of another vehicle depending on the state of the vehicle or a condition. That is, even if the charger is already connected to a vehicle, if another vehicle can obtain an opportunity of charging, the user of an electric vehicle can obtain further convenience.

SUMMARY OF THE INVENTION

The present disclosure has been made in consideration of the aforementioned issues, and realizes a technique in which another vehicle other than a vehicle connected to a charger can obtain an opportunity of charging.

In order to solve the aforementioned problems, one aspect of the present disclosure provides an electric vehicle comprising: a plurality of charging ports, at least one of which is configured to provide power to another vehicle; and at least one processor or circuit configured to function as following units: an authentication unit configured to authenticate an electronic device associated with the other vehicle using an electronic key; and a control unit configured to control, in accordance with an authentication result of the authentication unit, power provision to the other vehicle using the charging port configured to provide the power.

Another aspect of the present disclosure provides, a method for controlling an electric vehicle comprising a plurality of charging ports, at least one of which is configured to provide power to another vehicle, the method comprising: authenticating an electronic device associated with the other vehicle using an electronic key; and controlling, in accordance with an authentication result in the authenticating, power provision to the other vehicle using the charging port configured to provide the power.

Still another aspect of the present disclosure provides, a system comprising an electric vehicle and a charger configured to provide power to the electric vehicle, wherein the electric vehicle comprises: a plurality of charging ports, at least one of which is configured to provide power to another vehicle; and at least one processor or circuit configured to function as following units: an authentication unit configured to authenticate an electronic device associated with the other vehicle using an electronic key; and a control unit configured to control, in accordance with an authentication result of the authentication unit, power provision to the other vehicle using the charging port configured to provide the power based on power provided from the charger to the electric vehicle.

According to the present invention, another vehicle other than a vehicle connected to a charger can obtain an opportunity of charging.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 8 is a flowchart illustrating a series of operations of authenticating an electronic key in the electric vehicle according to the embodiment;

FIG. 9 is a flowchart illustrating a series of operations of controlling power provision in the electric vehicle according to the embodiment;

DESCRIPTION OF THE EMBODIMENTS

Figure 1:
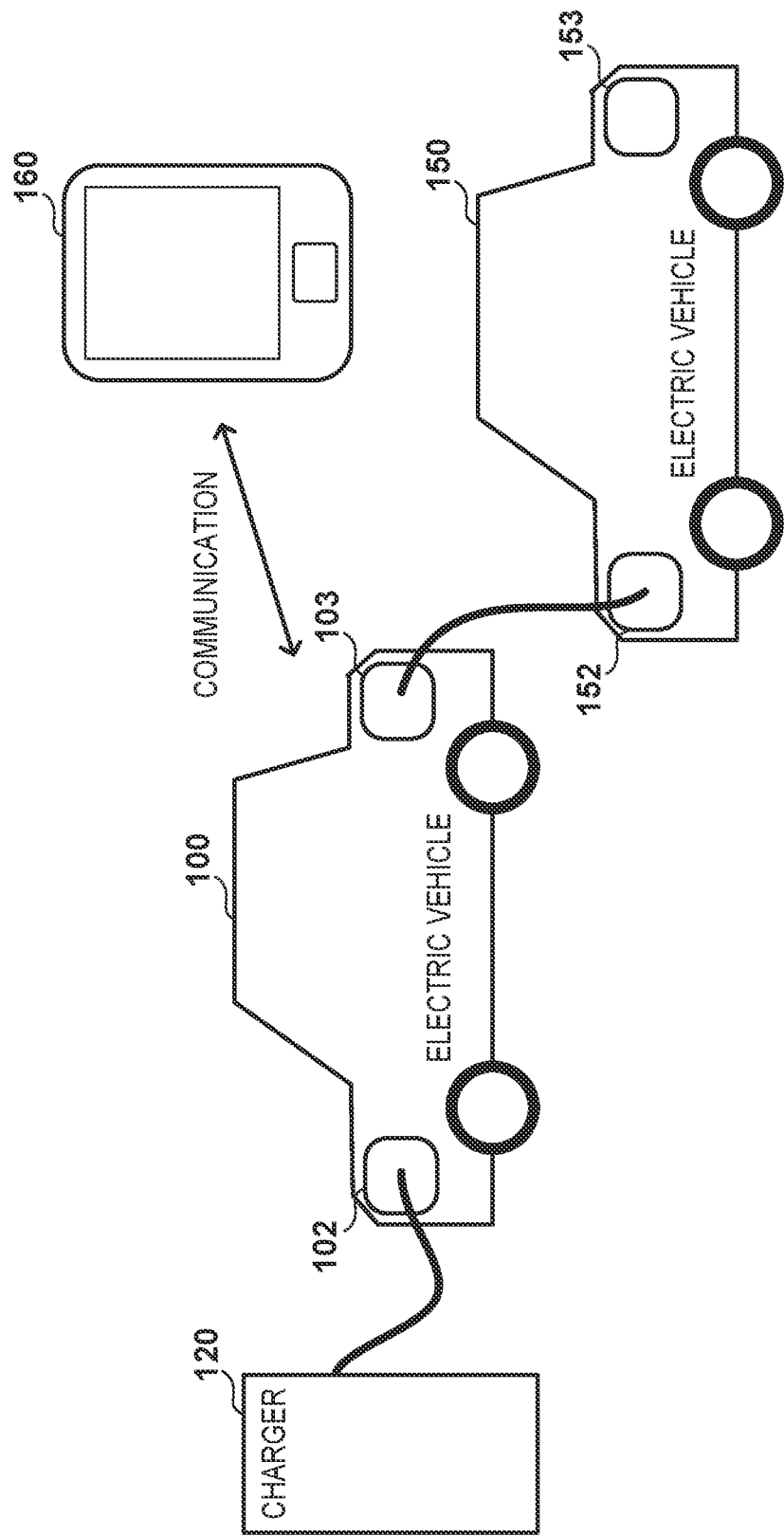
FIG. 1 is a view showing an example of a charging system including an electric vehicle and a charger according to an embodiment.

An exemplary embodiment of the present invention will be described in detail below with reference to the accompanying drawings. Note that a case in which power is provided from an electric vehicle connected to a charger to another vehicle different from the electric vehicle will be described below as an example. In the following example, a smartphone is used as an example of an electronic device. When the smartphone transmits an electronic key to an electric vehicle via wireless communication, charging from the charging port of the electric vehicle becomes possible. However, the present invention is not limited to this. The electronic device is not limited to the smartphone, and any device that can transmit an electronic key via wireless communication can be used. Examples of the device may be a personal computer, a tablet terminal, and a wearable terminal such as a wristwatch.

<Arrangement of Charging System>

A charging system according to this embodiment will be described with reference to FIG. 1. The charging system is formed from an electric vehicle 100 that drives a motor by electricity stored in a battery, and a charger 120 that provides power to the vehicle. The electric vehicle 100 includes a plurality of charging ports (for example, charging ports 102 and 103), and the charging port 102 is connected to the charger 120. On the other hand, the charging port 103 is a charging port capable of providing power to another vehicle 150, and is connected to a charging port 152 of the other vehicle 150 via a cable. Note that a charging port 153 of the electric vehicle 150 is assumed to be a charging port capable of providing power. The charging port capable of providing power may include a port into which a charging plug from a charger is inserted, and an output port for providing power, or may have one plug shape to obtain power from the charger and provide power to the vehicle.

A smartphone 160 can store an electronic key, and transmits the electronic key by communicating with the electric vehicle 100. The electric vehicle 100 can provide power to the other vehicle 150 when validity of the smartphone 160 can be confirmed by the electronic key. The electric vehicle 100 and the smartphone 160 can communicate with each other by near field wireless communication such as BLE (Bluetooth® Low Energy) or NFC.

<Arrangement of Charging Control in Electric Vehicle 100>

Figure 2:
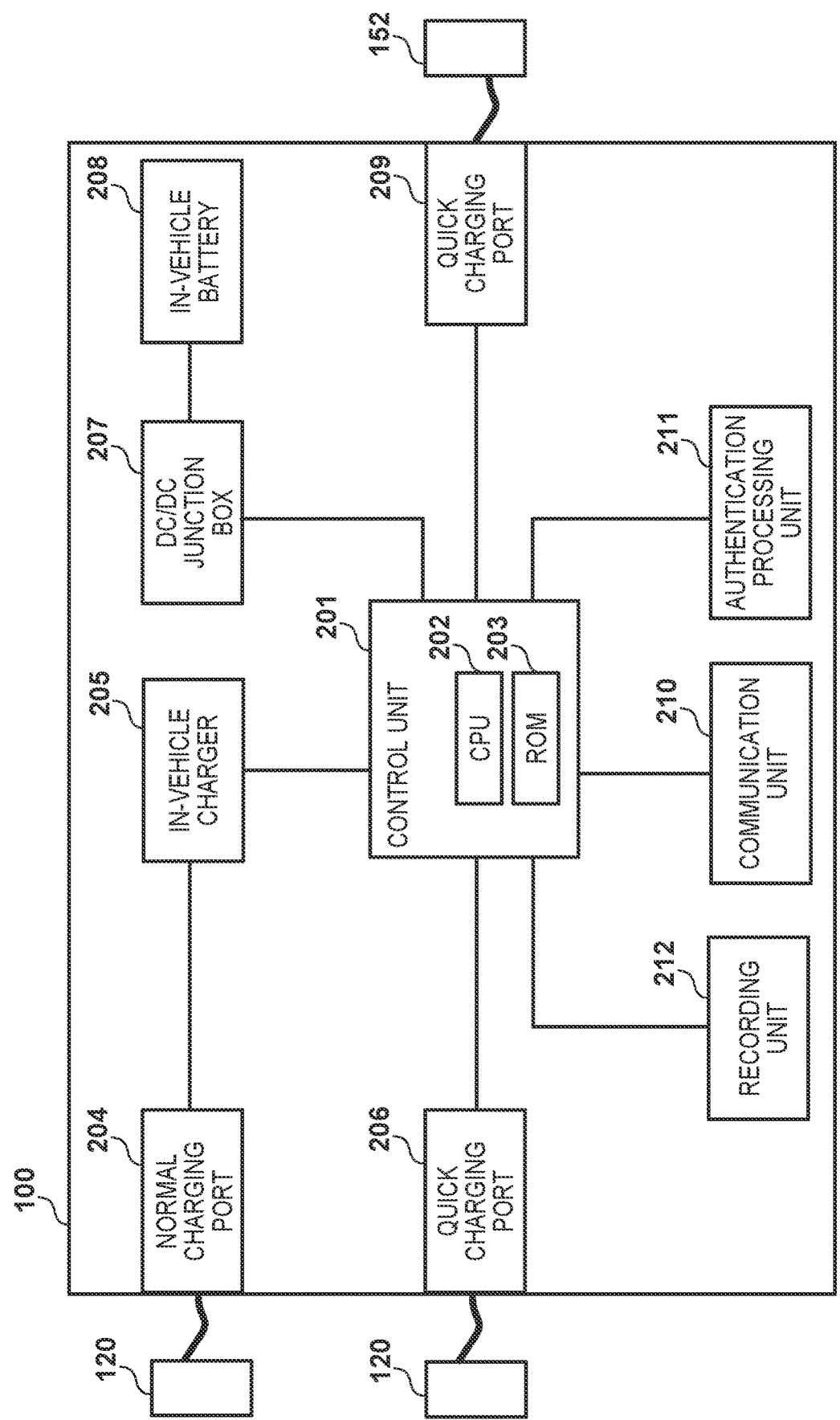
FIG. 2 is a block diagram showing an example of the functional arrangement of the electric vehicle according to the embodiment.

An example of an arrangement concerning charging control in the electric vehicle 100 will be described next with reference to FIG. 2. A control unit 201 includes a CPU 202 and a ROM 203, and controls charging control to an in-vehicle battery 208 of the electric vehicle 100 and charging control to the electric vehicle 150 when, for example, the CPU 202 executes a program recorded in the ROM 203.

A normal charging port 204 is a port into which a charging plug for normal charging extending from the charger 120 can be inserted. In normal charging, the charger 120 provides an AC current of 100 or 200 V. The in-vehicle battery 208 is a high-voltage battery formed by a lithium ion battery or the like, and stores/discharges a DC current of, for example, 360 V.

An in-vehicle charger 205 converts an AC current of 100 or 200 V from the normal charging port 204 into a DC current, and raises the voltage to, for example, 360 V storable in the in-vehicle battery 208.

A quick charging port 206 is a port into which a charging plug for quick charging complying with a standard such as CHAdeMO or Combo 1 can be inserted. In quick charging, for example, a large DC current of 50 kW (500 V, 125 A) in CHAdeMO or 200 kW (1,000 V, 200 A) in Combo 1 is input. A DC/DC junction box 207 controls charging of the DC current converted by the in-vehicle charger 205 and the DC current input from the quick charging port 206 to the in-vehicle battery 208.

A quick charging port 209 is a charging port capable of providing power to another vehicle, and forms, for example, a charging port capable of providing a current for quick charging. This embodiment will exemplify a case in which the charging port capable of providing power to another vehicle is a charging port that copes with quick charging. When providing power to another vehicle, it is more convenient for both the user of the other vehicle and the user of the vehicle for providing the charging function that a time for using the charging port is as short as possible. However, the charging port capable of providing power to another vehicle may be a charging port that copes with normal charging, as a matter of course. This embodiment describes an example of using the normal charging port and the quick charging port among the plurality of charging ports. However, the types of charging adapters may be the same. If a plurality of charging adapters are formed by charging adapters of the same type, it is possible to reduce the cost.

A communication unit 210 is, for example, a communication device including a communication circuit, and transmits/receives necessary data by, for example, establishing near field wireless communication complying with NFC with the smartphone 160 or performing connection to the Internet via mobile communication such as LTE. When the smartphone 160 is brought closer to the communication unit 210 within the communicable range of NFC, the communication unit 210 can establish near field wireless communication with the smartphone 160.

An authentication processing unit 211 is a dedicated hardware or software module that authenticates whether an electronic device that accesses to use some functions of the electric vehicle 100 is a valid device. If, for example, a valid electronic key is received via the communication unit 210, the authentication processing unit 211 authenticates that the device which has transmitted the electronic key is a valid device. In this embodiment, if the authentication processing unit 211 authenticates that the communication partner device is a valid device, the control unit 201 enables the charging port capable of providing power.

A recording unit 212 includes, for example, a nonvolatile memory such as a semiconductor memory, and records data processed by the control unit 201 and the like. For example, the recording unit 212 records information of the amount of power provided by the control unit 201 from the quick charging port 209 to an external vehicle and information of payment concerning the provided power. The recording unit 212 stores, for example, data of a distributed ledger used in blockchain, and holds information of the amount of provided power and information of payment concerning the provided power.

<Arrangement of Charger 120>

Figure 3:
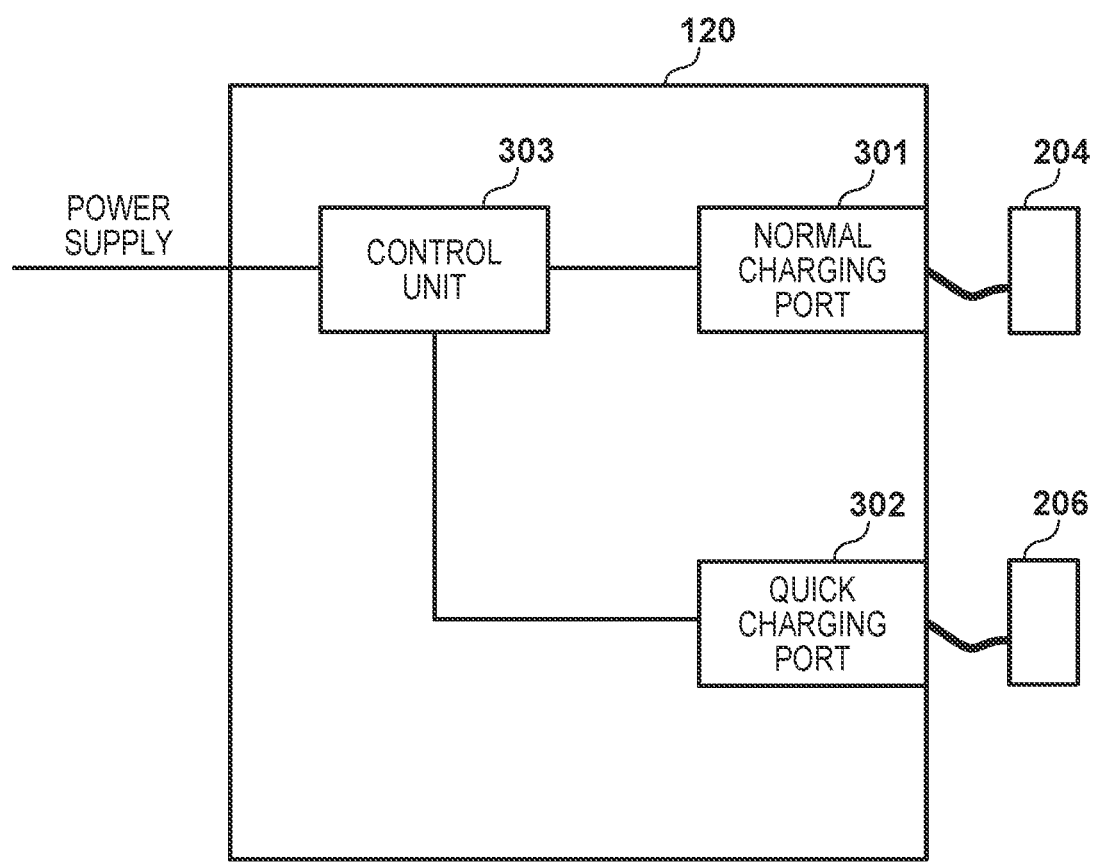
FIG. 3 is a block diagram showing an example of the functional arrangement of the charger according to the embodiment.

An example of the arrangement of the charger 120 will be described next with reference to FIG. 3. A normal charging port 301 is a port for outputting power to the normal charging port 204 of the electric vehicle. At the normal charging port, an AC current of 100 or 200 V is provided.

A quick charging port 302 is a port for outputting power to the quick charging port 206 of the electric vehicle, and outputs, for example, a current for quick charging complying with the standard such as CHAdeMO or Combo 1. In quick charging, for example, a large DC current of 50 kW (500 V, 125 A) in CHAdeMO or 200 kW (1,000 V, 200 A) in Combo 1 is output.

A control unit 303 receives a current from a power supply supplied from the outside of the charger 120, converts the current into power appropriate for the normal charging port 301 and the quick charging port, and provides the power to each charging port. The control unit 303 includes an operation member such as a switch operable by the user, and can switch ON/OFF of power provision.

<Arrangement of Smartphone 160>

Figure 4:
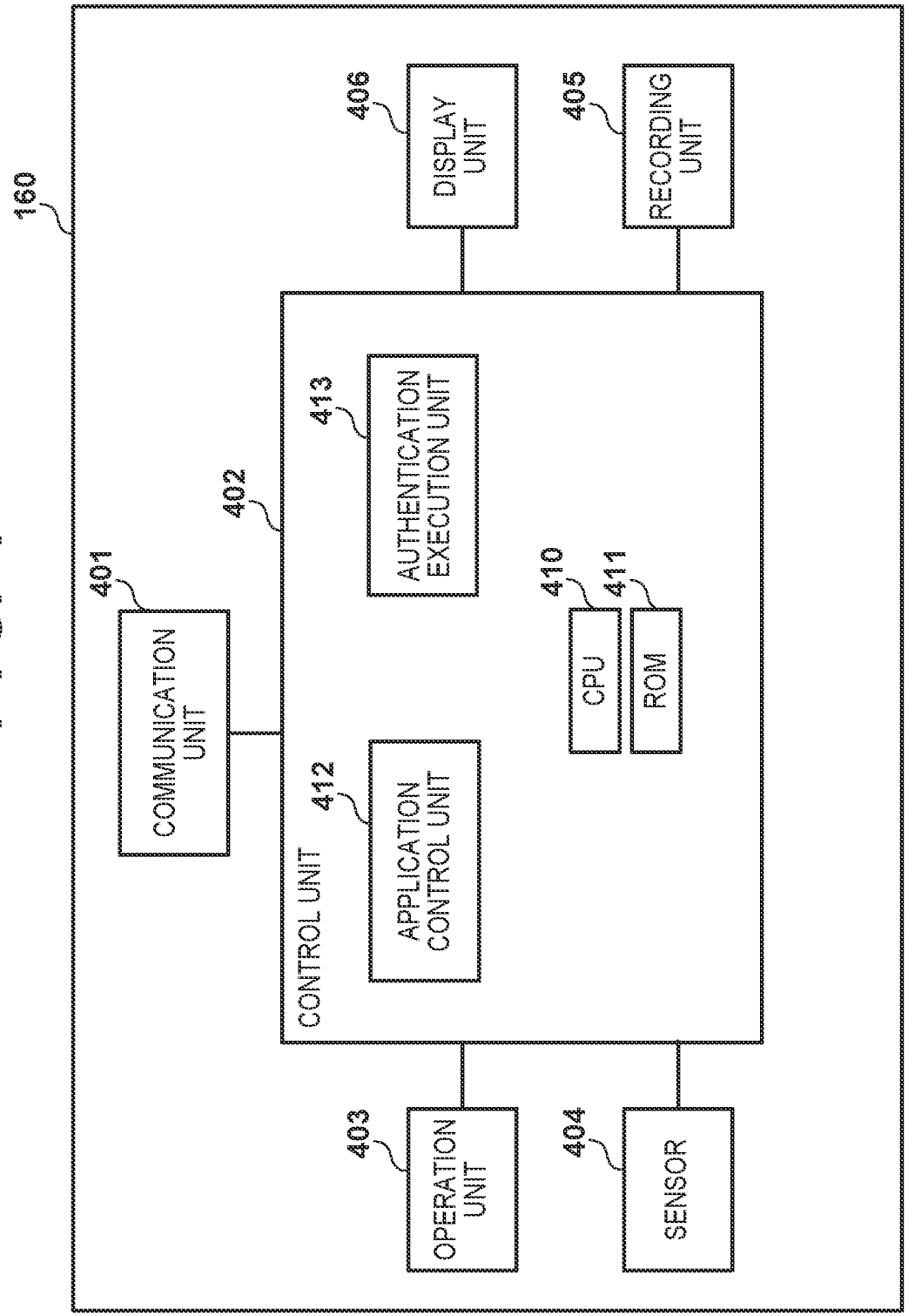
FIG. 4 is a block diagram showing an example of the functional arrangement of a smartphone as an example of an electronic device according to the embodiment.

Furthermore, the arrangement of the smartphone 160 according to this embodiment will be described with reference to FIG. 4. A communication unit 401 includes, for example, a communication device including a communication circuit, and transmits/receives necessary data by, for example, establishing near field wireless communication complying with NFC with an external apparatus or performing connection to the Internet via mobile communication such as LTE. When the electric vehicle 100 comes close to the communication unit 401 within the range in which NFC communication can be established, the communication unit 401 can establish NFC communication with the electric vehicle 100.

A control unit 402 includes a CPU 410 and a ROM 411. When, for example, the CPU 410 executes a program recorded in the ROM 411 or a recording unit 405, the control unit 402 controls the overall operation of the smartphone 160 or executes authentication processing (to be described later) by the smartphone. The control unit 402 includes an application control unit 412 and an authentication execution unit 413, both of which are associated with the authentication processing according to this embodiment. The programs to be executed by the control unit 402 include one or more application programs and the program of an operating system.

An operation unit 403 includes operation members such as a touch panel, a button, and a switch, and notifies the control unit 402 of information concerning operation contents in accordance with operation contents of the user. The touch panel is arranged to overlap the display screen of a display unit 406, and provides a contact operation on a GUI generated by an application program or a program of the operating system.

A sensor 404 includes, for example, an acceleration sensor, a gyro sensor, and a GPS, and transmits sensed sensor information to the control unit 402. For example, the acceleration sensor measures an acceleration of the smartphone 160 in each of three directions, and the gyro sensor measures an angular velocity applied to the smartphone 160. These pieces of measured sensor information are transmitted to the control unit 402, and used to analyze a vibration applied to the smartphone 160 and a change in orientation of the smartphone 160. The sensor 404 includes a sensor for biometric authentication, and can acquire biometric information of the user who uses the smartphone 160. In addition, the sensor 404 includes, for example, a camera, and can acquire, as biometric information, face image information obtained from the camera. The biometric information acquired by the sensor 404 is transmitted to the control unit 402, and it is possible to confirm validity of the user by user authentication using the biometric information.

The recording unit 405 includes, for example, a nonvolatile memory such as a semiconductor memory, and records an application program executed by the smartphone 160 or data used by the program. The display unit 406 is formed by, for example, an organic EL panel or a liquid crystal panel, and displays a GUI generated by an application program or a program of the operating system in accordance with an instruction of the control unit 402.

If a plurality of application programs are executed on the smartphone 160, the application control unit 412 controls which application program is to be set as an active application program. The application control unit 412 activates a power supply request application (to be described later) in accordance with a predetermined trigger, and controls the operation of the application.

The authentication execution unit 413 is a software module that executes processing for authenticating whether the smartphone 160 that accesses to use some functions of the electric vehicle 100 is a valid device. If, for example, the valid electronic key is received from a server (not shown) via the communication unit 401, the authentication execution unit 413 executes authentication processing with the electric vehicle 100 using the electronic key.

<Series of Operations of Charging Processing in Electric Vehicle>

Figure 5:
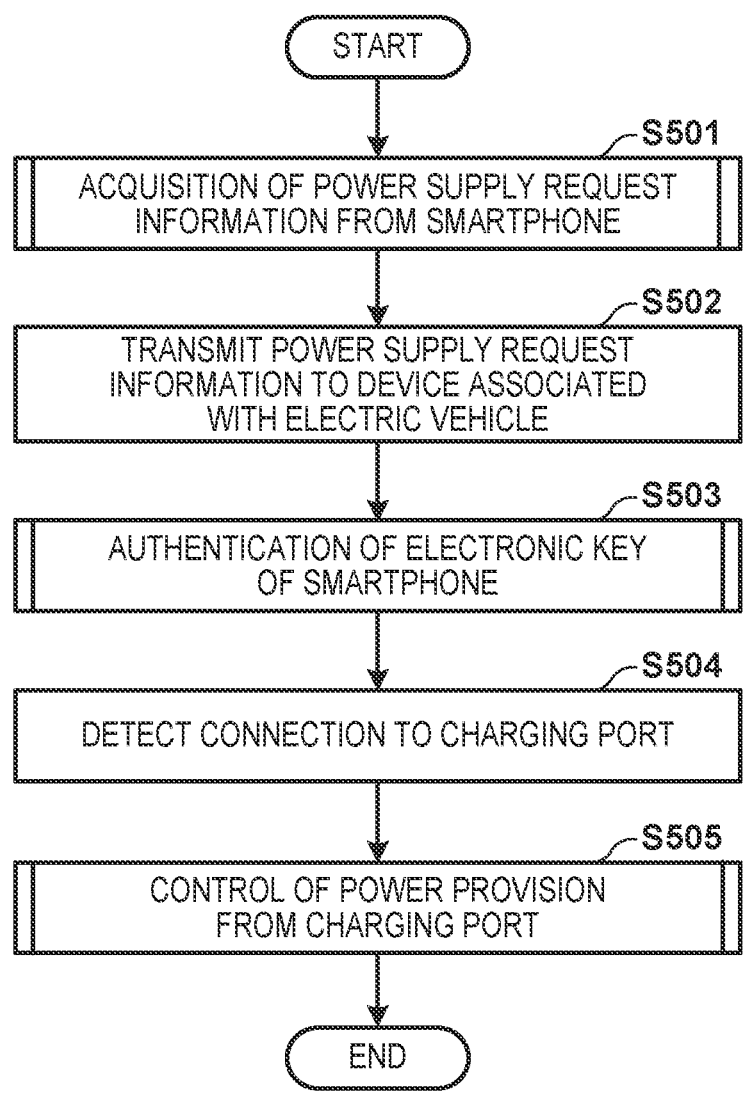
FIG. 5 is a flowchart illustrating a series of operations of charging processing in the electric vehicle according to the embodiment.

A series of operations of charging processing in the electric vehicle will be described next with reference to FIG. 5. Note that this processing is implemented when the CPU 202 of the control unit 201 executes a program recorded in the ROM 203 of the control unit 201.

In step S501, the control unit 201 acquires power supply request information when the smartphone 160 is brought closer. The power supply request information is information for requesting power provision from the charging port of the electric vehicle 100 to the electric vehicle 150 as another vehicle. The power supply request information may include identification information of the smartphone 160, identification information of the vehicle that receives power provision, and information of the degree (for example, the amount of power to be supplied or the time length) of power provision to be requested. Note that the processing of acquiring the power supply request information from the smartphone 160 will be described in detail later.

In step S502, the control unit 201 transmits, via the communication unit 401, the power supply request information acquired from the smartphone 160 to an electronic device (for example, the smartphone of the user of the electric vehicle 100) associated with the electric vehicle 100. At this time, the power supply request information may be transmitted to the smartphone of the user via a server (not shown) or transmitted to the smartphone of the user directly.

If the power supply request information is transmitted to the smartphone of the user directly, text information or voice information may be exchanged. The communication unit 401 transmits the power supply request information to, for example, an address preset on the Internet via mobile communication.

Note that if the power supply request information is transmitted to the smartphone of the user of the electric vehicle 100, the user of the electric vehicle 100 selects, on the smartphone, whether to accept the power supply request. This selection may be made automatically based on a condition preset by the user without requiring the operation of the user. If the user of the electric vehicle 100 accepts power provision request, the electronic key that enables the charging port of the electric vehicle 100 is transmitted from the server (not shown) or the smartphone of the user to the smartphone 160.

In step S503, the control unit 201 authenticates the electronic key of the smartphone 160. Although the detailed processing of this step will be described later, the control unit 201 receives the electronic key from the close smartphone 160 via near field wireless communication, and determines the validity of the electronic key, thereby authenticating the electronic key of the smartphone 160. If the control unit 201 authenticates the validity of the electronic key, it permits the use of the quick charging port 209, and unlocks the cover (not shown) of the quick charging port 209 to be opened/closed.

In step S504, the control unit 201 detects connection of the charging plug to the quick charging port 209 (when the user of the electric vehicle 150 opens the cover (not shown) of the charging port and inserts the charging plug into the quick charging port 209).

In step S505, the control unit 201 controls power provision from the charging port. If the charger 120 provides power, the control unit 201 distributes and provides the power from the charger 120 to the electric vehicle 150 or provides the power from the charger 120 to only the electric vehicle 150. A more detailed description thereof will be provided later. After power provision to the electric vehicle 150 ends, the control unit 201 ends the series of operations of the charging processing in the electric vehicle.

<Series of Operations of Authentication Processing in Smartphone>

Figure 6:
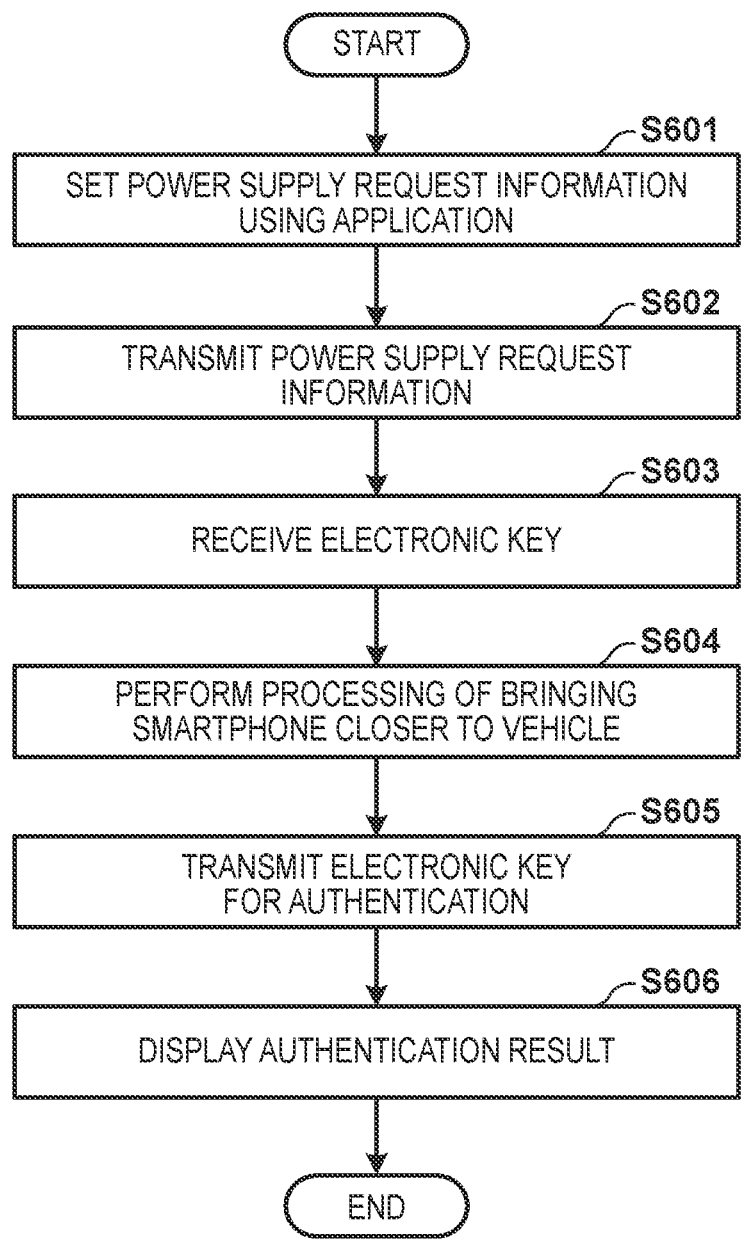
FIG. 6 is a flowchart illustrating a series of operations of authentication processing in the smartphone according to the embodiment.

A series of operations of authentication processing in the smartphone 160 will be described next with reference to FIG. 6. Note that this processing is implemented when the CPU 410 of the control unit 402 executes a program recorded in the ROM 411 of the control unit 402.

In step S601, in response to an operation on the operation unit 403 by the user of the smartphone 160, the control unit 402 activates an application for issuing a power supply request. The activated application sets power supply request information to request the electric vehicle 100. After activating the application, the application control unit 412 acquires identification information and the remaining battery level of the electric vehicle 150 by performing BLE communication or the like with the electric vehicle 150 (that is, the electric vehicle with which the smartphone 160 is associated). The remaining battery level may be data converted into an amount of money required for charging. The application control unit 412 displays, to the user of the electric vehicle 150, a GUI for setting a required charge amount of the battery, and sets a desired charge capacity in the power supply request information in accordance with an operation by the user. The control unit 402 temporarily records, in the recording unit 405, the power supply request information in which identification information of the smartphone 160 and identification information of the vehicle that receives power provision are additionally set.

In step S602, in response to the start of near field wireless communication when the smartphone 160 is brought closer to the electric vehicle 100, the control unit 402 transmits the set power supply request information to the electric vehicle 100. Note that as described above, if the power supply request information is transmitted to the electric vehicle 100, the electric vehicle 100 transmits the power supply request information to the smartphone of the user of the electric vehicle 100. Then, if the user of the electric vehicle 100 permits the power supply request information, the server (not shown) transmits the electronic key to the smartphone 160.

In step S603, the control unit 402 receives the electronic key. After that, the control unit 402 controls the application control unit 412 to display, on the application, a notification that the electronic key has been received. The control unit 402 may control the application control unit 412 to display a notification for prompting the user to bring the smartphone 160 closer to the electric vehicle 100 again in order to use the electronic key. By notifying the user of the smartphone that the electronic key has been received, the user can quickly bring the smartphone 160 closer to the electric vehicle 100.

In step S604, the control unit 402 restarts near field wireless communication when the smartphone 160 is brought closer to the electric vehicle 100. In step S605, the authentication execution unit 413 transmits the electronic key acquired in step S603 to the electric vehicle 100 via the started near field wireless communication.

In step S606, the authentication execution unit 413 receives, from the electric vehicle 100, the result of the authentication processing executed on the side of the electric vehicle 100. The control unit 402 displays the authentication result on the application via the application control unit 412. By confirming the authentication result displayed on the application, the user of the smartphone 160 can determine whether to insert the charging plug for charging the electric vehicle 150 into the quick charging port 209 of the electric vehicle 100. After the processing of displaying the authentication result on the application ends, the control unit 402 ends the series of operations of the authentication processing in the smartphone 160.

<Series of Operations of Acquiring Power Supply Request Information in Electric Vehicle>

Figure 7:
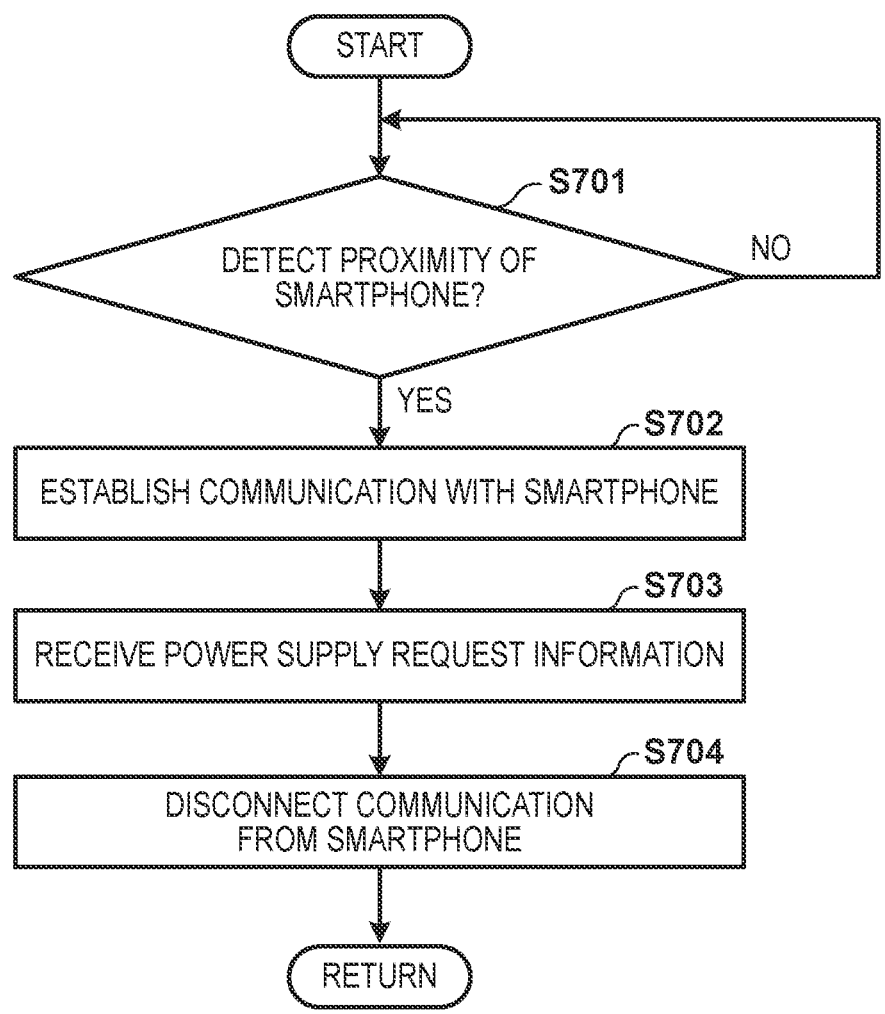
FIG. 7 is a flowchart illustrating a series of operations of acquiring power supply request information in the electric vehicle according to the embodiment.

A series of operations of acquiring the power supply request information in the electric vehicle 100, which is executed in step S501, will be described next with reference to FIG. 7. Note that this processing starts when the user of the smartphone 160 brings the smartphone 160, in which the power supply request information is set, closer to an electric vehicle (in this example, the electric vehicle 100) from which the user wants to receive power provision by connecting the charging plug.

In step S701, the control unit 201 determines whether the proximity of the smartphone 160 is detected. If the control unit 201 determines, based on discovery of an electronic device using near field wireless communication by the communication unit 210, that the proximity of the smartphone 160 is detected, the process advances to step S702; otherwise, step S701 is repeated.

In step S702, the control unit 201 controls the communication unit 210 to start near field wireless communication with the smartphone 160. In step S703, the control unit 201 receives, via the communication unit 210, the power supply request information transmitted from the smartphone 160. Upon receiving the power supply request information, the control unit 201 disconnects, in step S704, the near field wireless communication from the smartphone 160, and returns to the caller.

<Series of Operations of Authenticating Electronic Key in Electric Vehicle>

A series of operations of authenticating the electronic key of the smartphone 160, which is executed in step S503, will be described next with reference to FIG. 8. Note that this processing starts when the smartphone 160 which has received the electronic key from the server (not shown) in step S603 is brought again closer to the electric vehicle 100.

In step S801, the control unit 201 determines whether the proximity of the smartphone 160 is detected. If the control unit 201 determines, based on discovery of an electronic device using near field wireless communication by the communication unit 210, that the proximity of the smartphone 160 is detected, the process advances to step S802; otherwise, step S801 is repeated.

In step S802, the control unit 201 controls the communication unit 210 to start near field wireless communication with the smartphone 160. In step S803, the control unit 201 receives, via the communication unit 210, the electronic key transmitted from the smartphone 160. In step S804, the authentication processing unit 211 determines whether the received electronic key is valid. If the authentication processing unit 211 determines that the electronic key is valid, the process advances to step S805; otherwise, the process advances to step S806. Note that in this step, in addition to determination of whether the electronic key is valid, it may be determined, by setting, in the electronic key, a predetermined condition under which the charging port of the electric vehicle 100 is usable, whether the current status of the electric vehicle 100 matches the predetermined condition. The predetermined condition includes, for example, a usable time, designation of the position of the charging port such as the front/rear side of the vehicle, or a specific charging port. After these processes end, the control unit 201 returns to the processing of the caller.

In step S805, the control unit 201 permits the use of the charging port (for example, the quick charging port 209), and unlocks the cover (not shown) of the charging port. On the other hand, if the electronic key is invalid (or the status does not match the predetermined condition), the control unit 201 does not permit the use of the charging port, and maintains the lock of the cover (not shown) of the charging port. After the processing in step S805 ends, the control unit 201 returns to the processing of the caller.

<Series of Operations of Controlling Power Provision in Electric Vehicle>

A series of operations of controlling power provision, which is executed in step S505, will be described next with reference to FIG. 9. Note that if the use of the charging port is not permitted in step S806, the series of operations of the charging processing may end.

In step S901, the control unit 201 determines whether power provision is received from the charging port (to be simply referred to as the first charging port hereinafter) (for example, the quick charging port 206) to which the charging port from the charger 120 is connected. If the control unit 201 determines that power provision is received from the first charging plug, the process advances to step S903; otherwise, the process advances to step S902.

In step S902, in response to a request of power provision from the electric vehicle 150, the control unit 201 extracts power from the in-vehicle battery and outputs it. In step S903, the control unit 201 determines whether it is necessary to charge the in-vehicle battery 208 of the self-vehicle (electric vehicle 100). Whether it is necessary to charge the in-vehicle battery 208 of the self-vehicle is determined in accordance with whether the in-vehicle battery 208 is in a predetermined charging state. If the in-vehicle battery 208 is in the predetermined charging state, for example, power more than a predetermined value is stored in the in-vehicle battery 208 of the self-vehicle or the planned use time of the self-vehicle is set and there is a time longer than a predetermined time until the planned use time. The power supply request information to be transmitted to the user of the electric vehicle 100 may include the necessity of charging of the in-vehicle battery 208 or a distribution ratio. If the control unit 201 determines that it is necessary to charge the in-vehicle battery 208, the process advances to step S904; otherwise, the process advances to step S905.

In step S904, the control unit 201 distributes power input from the first charging port to the in-vehicle battery 208 and the charging port (for example, the quick charging port 209) (to be also referred to as the second charging port hereinafter) that provides power. In step S905, the control unit 201 provides power input from the first charging port to only the second charging port because, for example, the in-vehicle battery stores enough power. That is, power provided from the charger to the self-vehicle is assigned to only power to be supplied to another vehicle (electric vehicle 150).

As described above, if the self-vehicle is sufficiently charged or if the self-vehicle stores enough power and can thus be charged later, even if another vehicle (the electric vehicle 150 that requests power provision) is preferentially charged over the self-vehicle, this hardly gives an adverse effect. That is, it is possible to quickly charge another vehicle while suppressing an adverse effect that the self-vehicle is insufficiently charged.

In step S906, the control unit 201 determines whether charging of the other vehicle (electric vehicle 150) has ended. If the control unit 201 determines that, for example, power is provided by a desired charge capacity or a desired amount of power set in the power supply request information, it determines to end charging. The electric vehicle 100 may further include a measurement unit (not shown) that measures the amount of power provided to the other vehicle. The control unit 201 may provide the measured amount of power to an external electronic device (an accounting server or another vehicle) via the communication unit 210 in order to charge a value corresponding to the provided power. Alternatively, the control unit 201 may record, as a transaction, a record of the measured amount of power, charging of a value corresponding to the amount of power, or payment of the value from the other vehicle in a distributed ledger stored in the recording unit 212. Since the record in the distributed ledger is shared with another node of blockchain, the record is secure with a low risk of alteration, and the nodes storing the distributed ledger can perform distribution processing. The user who provides power from the charging port can obtain some value (for example, money, a point, or a virtual currency). If the user allows the vehicle 150 to go first, a value corresponding to a time acquired by the user of the vehicle 150 may be included in addition to the value corresponding to the provided amount of power.

If the control unit 201 determines that charging of the other vehicle has not ended, the process returns to step S906; otherwise, power provision from the charging port is stopped in step S907, and the series of operations ends.

Figure 10A:
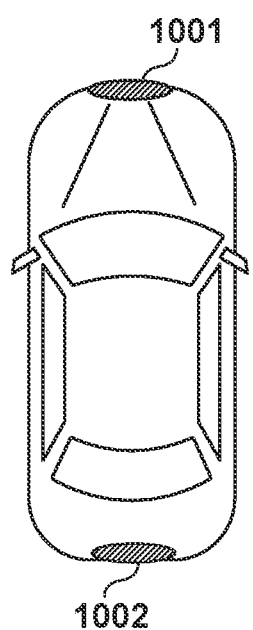
FIGS. 10A to 10C are views each for explaining an example in which a plurality of charging ports are respectively arranged on the front and rear surfaces of a vehicle.
Figure 10B:
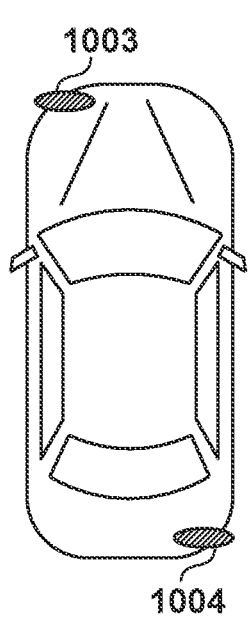
Figure 10C:
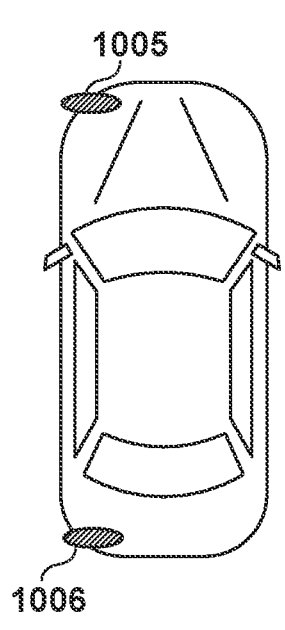

Note that in the above-described embodiment, the case in which the charging ports 102 and 103 are arranged on the side surface of the vehicle, as shown in, for example, FIG. 1, has been exemplified. However, a charging port capable of providing power, as shown in FIG. 10A, 10B, or 10C, may be provided in one end portion in the front-and-rear direction of the electric vehicle, and at least one of the remaining charging ports of the plurality of charging ports may be provided in the other end portion in the front-and-rear direction of the electric vehicle. In an example shown in each of FIGS. 10A, 10B, and 10C, reference numeral 1001, 1003, or 1005 denotes a charging port for performing charging from a charger; and 1002, 1004, or 1006, a charging port capable of providing power to another vehicle. That is, if the charging port for performing charging from the charger is located on the front side as a charger side, the charging port capable of providing power is located on the rear side, and a vehicle located behind can readily use the charging port capable of providing power. Furthermore, another vehicle can be charged without moving the vehicle that is charged from the charger.

Figure 11:
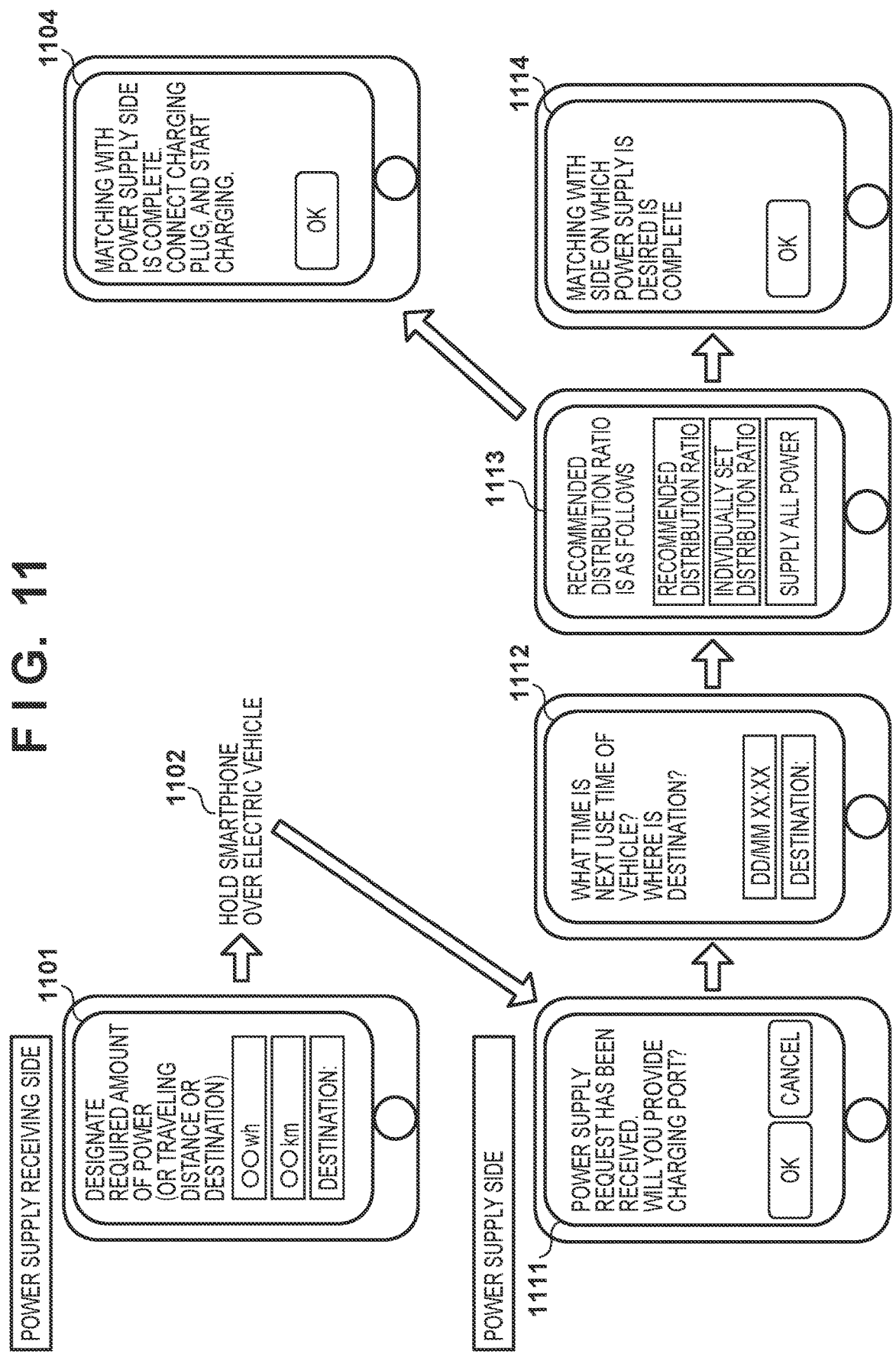
FIG. 11 is a view for explaining practical examples of screen display of the smartphone according to the embodiment.

Practical examples of screen display of the smartphone in the above-described series of operations will be described with reference to FIG. 11. Display 1101 shown in FIG. 11 represents a display example of the smartphone 160 used on the side on which power is received. This display is displayed in the processing, described with reference to FIG. 6, executed in the smartphone 160 in step S601. That is, the user of the smartphone 160 can set an amount of power, a traveling distance, a destination, and the like using the screen display represented by the display 1101 in setting of a desired charge capacity. In the example of FIG. 11, in an operation 1102, the smartphone 160 in which the power supply request information is set is brought closer to the electric vehicle 100 (that is, step S602 of FIG. 6). This transmits the power supply request information to the electric vehicle 100, and the electric vehicle 100 transmits the power supply request information to the associated smartphone. This operation corresponds to the above-described processing in step S502.

On the other hand, displays 1111 to 1114 shown in FIG. 11 represent display examples of the power supply side, that is, the smartphone associated with the electric vehicle 100. The display 1111 represents screen display for notifying that the smartphone receives the power supply request information, that is, that the smartphone receives a power supply request. The user of the electric vehicle 100 decides whether to supply power, and presses a corresponding button. When the user of the electric vehicle 100 decides to supply power, the smartphone displays the display 1112. The smartphone inquires, in the display 1112, about the time at which the electric vehicle 100 (the currently parked electric vehicle 100) is planned to be used next and about the destination. As described above, by acquiring the planned use time and the destination from the user, it is possible to transmit the power supply request information including the necessity of charging to the electric vehicle 100. When the electric vehicle 100 receives the power supply request information from the smartphone (directly or via the server (not shown)), the necessity of charging of the self-vehicle can appropriately be determined in the processing in step S903 (that is, power supply to another vehicle can be controlled appropriately). As indicated by the display 1113, the smartphone may perform display for proposing a method of distributing power to the electric vehicle 150 by the electric vehicle 100. For example, if the smartphone can grasp the state of the electric vehicle 100 via a network, a recommended distribution ratio is presented based on the information input to the display 1112 and the remaining battery level of the electric vehicle 150. Alternatively, the user may set a desired distribution ratio for each request. Furthermore, a setting can be made to supply all power from the charger 120 to the vehicle 150. The setting by the user in the display 1113 is added to the power supply request information, and transmitted to the electric vehicle 100 (directly or via the server (not shown)). Upon transmitting the power supply request information, the smartphone used by the user of the electric vehicle 100 displays the display 1114 to perform display to indicate that matching between the power supply receiving side and the power supply side is complete (the condition is matched).

The smartphone used by the user of the electric vehicle 100 may notify (directly or via the server (not shown)) the smartphone 160 that the power supply request has been accepted. In this case, the smartphone 160 displays display 1104. At this time, in the display 1104 or in different displays before the display 1104, the smartphone 160 may notify in step S603 described above that the electronic key has been received and issue a request to bring the smartphone 160 closer to the electric vehicle 100.

In the above-described example, information concerning a power supply request is input on the smartphone 160, and the smartphone 160 is brought closer to the electric vehicle 100, thereby transmitting the power supply request information to the electric vehicle 100 (then, the electric vehicle 100 transmits the power supply request information). However, such operations and processes concerning the power supply request may be performed in another form shown in, for example, FIG. 12. Note that the same reference numerals as those described above denote common display contents and operations and a description thereof will be omitted. The difference will mainly be described.

Figure 12:
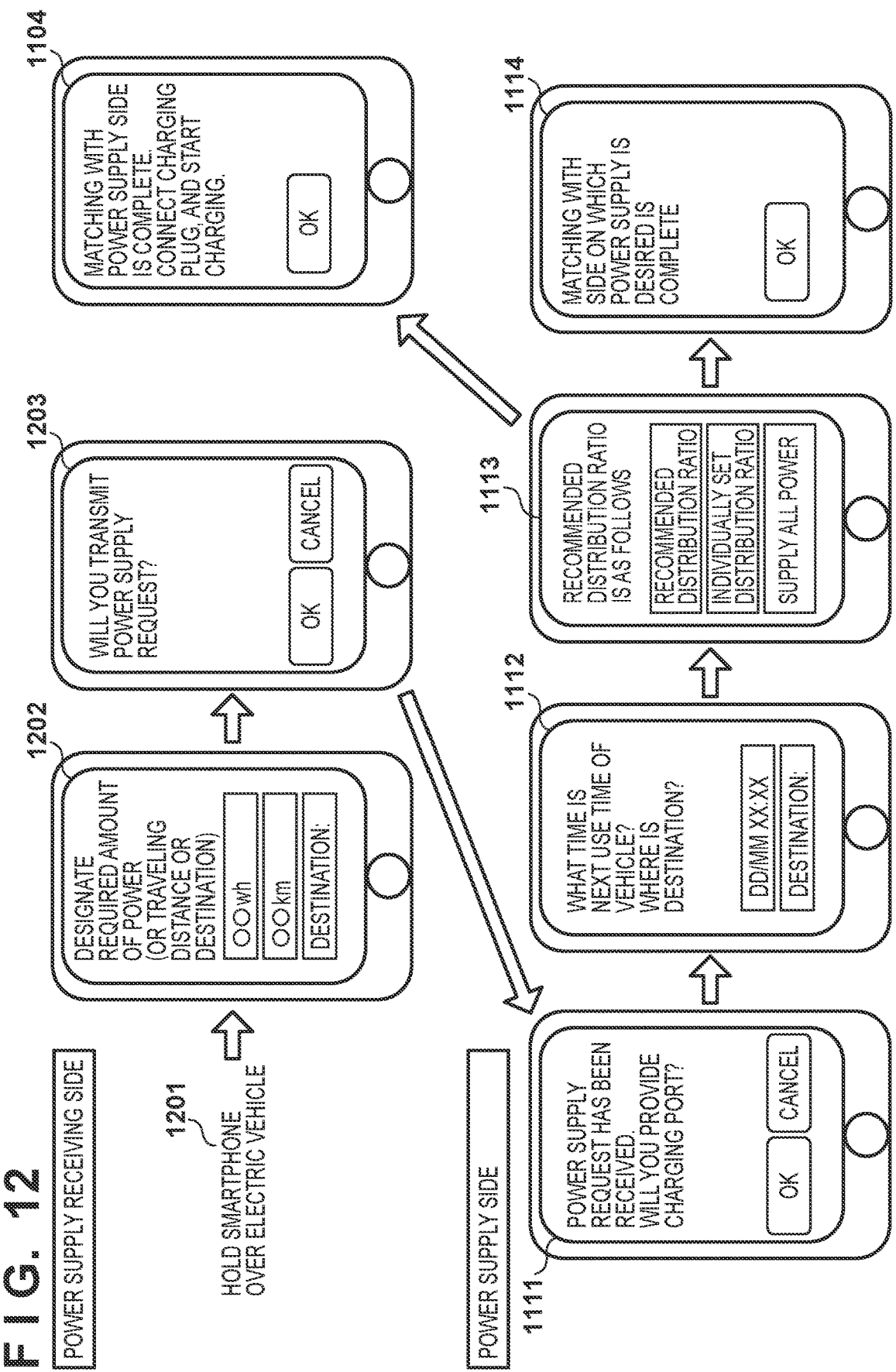
FIG. 12 is a view for explaining another form of screen display of the smartphone.

In an operation 1201 shown in FIG. 12, the smartphone 160 is brought closer to the electric vehicle 100. In response to proximity, the smartphone 160 activates an application to display a setting screen associated with the power supply request. Display 1202 corresponds to the display 1101 shown in FIG. 11, in which a requested amount of power, a traveling distance, a destination, and the like can be set. When information concerning the power supply request is input from the user, the smartphone 160 confirms whether to transmit the request in display 1203. Upon receiving an instruction to transmit the request, the smartphone 160 transmits the power supply request information to the smartphone associated with the electric vehicle 100 (directly or via the server (not shown)). In this case, upon receiving the power supply request information from the smartphone 160, the smartphone associated with the electric vehicle 100 performs processes similar to the displays 1111 to 1114 described above, and ends the processing for the power supply request.

Note that if matching fails, or if it takes time to complete matching since, for example, the supplier does not notice the smartphone, the user is dissatisfied. To cope with this, some of the processes described in the above example may be performed in advance. As an example, a matching success rate may be calculated in advance by acquiring the scheduled departure time of the supplier, a request of supplying power, and the cruisable distance, the destination, and the required amount of power of the user, and information of the supplier and information of the matching success rate may be presented by a car navigation system. Furthermore, the scheduled departure time and the request of supplying power may be displayed on an external display to the electric vehicle 100.

Summary of Embodiments

1. According to the above embodiment, there is provided an electric vehicle (for example, reference numeral 100) comprising:

a plurality of charging ports (for example, 204, 206, 209), at least one of which is configured to provide power to another vehicle;

an authentication unit (for example, 211) configured to authenticate an electronic device associated with the other vehicle using an electronic key; and a control unit (for example, 201) configured to control, in accordance with an authentication result of the authentication unit, power provision to the other vehicle using the charging port configured to provide the power.

According to this embodiment, another vehicle other than a vehicle connected to a charger can obtain an opportunity of charging.

2. In the above embodiment, the charging port configured to provide the power is provided in one end portion in a front-and-rear direction of the electric vehicle, and at least one of the remaining charging ports of the plurality of charging ports is provided in the other end portion in the front-and-rear direction of the electric vehicle.

According to this embodiment, if a charging port for performing charging from a charger is located on the front side as the charger side, a charging port capable of providing power is located on the rear side, and a vehicle located behind can readily use the charging port capable of providing power. Furthermore, another vehicle can be charged without moving a vehicle that is charged from the charger.

3. In the above embodiment, if power is provided to the other vehicle using the charging port configured to provide the power, the control unit provides the other vehicle with at least part of power provided from an external charger to the electric vehicle (for example, S901, S904, S905).

According to this embodiment, it is possible to provide power from the charger to the other vehicle connected to the charging port.

4. In the above embodiment, the control unit distributes, to power to be supplied to an in-vehicle battery in the electric vehicle and power to be supplied to the other vehicle, the power provided from the external charger to the electric vehicle (for example, S903, S904).

According to this embodiment, the electric vehicle can provide the power from the charger to the other vehicle connected to the charging port while using the power from the charger to charge the self-vehicle.

5. In the above embodiment, if the electric vehicle satisfies a predetermined charging state when power is provided to the other vehicle using the charging port configured to provide the power, the control unit assigns, to only power to be supplied to the other vehicle, the power provided from the external charger to the electric vehicle (for example, S903, S905).

According to this embodiment, if the predetermined charging state is satisfied, it is possible to preferentially charge the other vehicle over the self-vehicle. That is, it is possible to quickly charge the other vehicle while suppressing an adverse effect that the self-vehicle is insufficiently charged.

6. In the above embodiment, the predetermined charging state is one of a state in which power more than a predetermined value is stored in the in-vehicle battery in the electric vehicle and a state (for example, S903) in which there is a time longer than a predetermined time until a planned use time of the electric vehicle.

According to this embodiment, if the self-vehicle is sufficiently charged or if the self-vehicle stores enough power and can thus be charged later, it is possible to preferentially charge the other vehicle over the self-vehicle.

7. In the above embodiment, if power is provided to the other vehicle using the charging port configured to provide the power, the control unit provides the other vehicle with at least part of power stored in the in-vehicle battery in the electric vehicle (for example, S902).

According to this embodiment, it is possible to provide power from the in-vehicle battery of the electric vehicle to the charging port.

8. In the above embodiment, after the electronic device associated with the other vehicle is brought closer to the electric vehicle, the authentication unit authenticates the electronic device associated with the other vehicle using the electronic key (for example, S501, S503).

According to this embodiment, it is possible to authenticate the smartphone using, as a trigger, an easy operation of bringing the smartphone of the user of the other vehicle closer to the electric vehicle.

9. In the above embodiment, the electric vehicle further comprises a communication unit (for example, 210) configured to communicate with an electronic device associated with the electric vehicle, and when the electronic device associated with the other vehicle is brought closer to the electric vehicle (for example, S501, S502), the communication unit transmits information for requesting power provision of the electric vehicle to the electronic device associated with the electric vehicle.

According to this embodiment, it is possible to make contact with the smartphone of the user of the electric vehicle by an easy operation of bringing the smartphone of the user of the other vehicle closer to the electric vehicle, and the users can negotiate about power provision.

10. In the above embodiment, when the information for requesting the power provision of the electric vehicle is transmitted to the electronic device associated with the electric vehicle, the electronic key is provided to the electronic device associated with the other vehicle by predetermined communication.

According to this embodiment, when power provision request information is transmitted to the smartphone of the user of the electric vehicle, the electronic key is provided to the smartphone of the user of the other vehicle via the user of the electric vehicle. That is, even if the user of the electric vehicle is physically away from the user who receives power provision, the user of the electric vehicle can readily provide the electronic key without direct interaction.

11. In the above embodiment, in response to permission of the information for requesting the power provision of the electric vehicle by a user associated with the electric vehicle, the electronic key is provided to the electronic device associated with the other vehicle by predetermined communication.

According to this embodiment, the user associated with the electric vehicle can determine permission/non-permission of the power provision request information, and provide the electronic key in response to a convenient request.

12. In the above embodiment, the electric vehicle further comprises a measurement unit configured to measure an amount of power provided to the other vehicle using the charging port configured to provide the power (for example, S906), and the measured amount of power is provided to an electronic device outside the electric vehicle via predetermined communication unit in order to charge a value corresponding to the provided power.

According to this embodiment, it is possible to communicate with the other vehicle to charge the value corresponding to the provided power, and use a service for acquiring the value.

13. In the above embodiment, the plurality of charging ports are formed by charging adapters of the same type.

According to this embodiment, if the charging ports are of the same type, the cost can be reduced.

14. A method for controlling an electric vehicle according to the above embodiment is a method for controlling an electric vehicle comprising a plurality of charging ports (for example, 204, 206, 209), at least one of which is configured to provide power to another vehicle, the method comprising:

an authentication step of causing an authentication unit to authenticate an electronic device associated with the other vehicle using an electronic key (for example, S503); and a control step of causing a control unit to control, in accordance with an authentication result of the authentication unit, power provision to the other vehicle using the charging port configured to provide the power (S505).

According to this embodiment, another vehicle other than a vehicle connected to a charger can obtain an opportunity of charging.

15. A program according to the above embodiment is a program for causing a computer to function as each unit of an electric vehicle defined in any one of 1 to 14 described above.

According to this embodiment, another vehicle other than a vehicle connected to a charger can obtain an opportunity of charging.

16. A system according to the above embodiment is a system comprising an electric vehicle (for example, 100) and a charger (for example, 120) configured to provide power to the electric vehicle, wherein the electric vehicle comprises:

a plurality of charging ports (for example, 204, 206, 209), at least one of which is configured to provide power to another vehicle;

an authentication unit (for example, 211) configured to authenticate an electronic device associated with the other vehicle using an electronic key; and a control unit (for example, 201) configured to control, in accordance with an authentication result of the authentication unit, power provision to the other vehicle using the charging port configured to provide the power based on power provided from the charger to the electric vehicle.

According to this embodiment, another vehicle other than a vehicle connected to a charger can obtain an opportunity of charging.

The invention is not limited to the foregoing embodiments, and various variations/changes are possible within the spirit of the invention.

What is claimed is:

1. An electric vehicle comprising:
a plurality of charging ports, at least one of which is configured to provide power to another vehicle; and
at least one processor circuit with a memory comprising instructions, that when executed by the processor circuit, cause the at least one processor circuit to at least:
authenticate an electronic device associated with the other vehicle using an electronic key; and
control, in accordance with an authentication result of the authentication unit, power provision to the other vehicle using the charging port configured to provide the power,
wherein in a case where power is provided to the other vehicle using the charging port configured to provide the power, the other vehicle is provided with at least part of power provided from an external charger to the electric vehicle.

2. The electric vehicle according to claim 1, wherein
the charging port configured to provide the power is provided in one end portion in a front-and-rear direction of the electric vehicle, and
at least one of the remaining charging ports of the plurality of charging ports is provided in the other end portion in the front-and-rear direction of the electric vehicle.

3. The electric vehicle according to claim 1, wherein the power provided from the external charger is distributed to the electric vehicle to supply power to an in-vehicle battery in the electric vehicle and to supply power to the other vehicle.

4. The electric vehicle according to claim 3, wherein in a case where the electric vehicle satisfies a predetermined charging state when power is provided to the other vehicle using the charging port configured to provide the power, the power provided from the external charger to the electric vehicle is assigned only to supply the other vehicle.

5. The electric vehicle according to claim 4, wherein the predetermined charging state is one of a state in which power more than a predetermined value is stored in the in-vehicle battery in the electric vehicle and a state in which there is a time longer than a predetermined time until a planned use time of the electric vehicle.

6. The electric vehicle according to claim 1, wherein in a case where power is provided to the other vehicle using the charging port configured to provide the power, the other vehicle is provided with at least part of power stored in the in-vehicle battery in the electric vehicle.

7. The electric vehicle according to claim 1, wherein after the electronic device associated with the other vehicle is brought closer to the electric vehicle, the authentication unit authenticates the electronic device associated with the other vehicle using the electronic key.

8. The electric vehicle according to claim 7, further comprising a communication circuit configured to communicate with an electronic device associated with the electric vehicle,
wherein in response to the electronic device associated with the other vehicle being brought closer to the electric vehicle, the communication circuit transmits information for requesting power provision of the electric vehicle to the electronic device associated with the electric vehicle.

9. The electric vehicle according to claim 8, wherein in response to the information for requesting the power provision of the electric vehicle being transmitted to the electronic device associated with the electric vehicle, the electronic key is provided to the electronic device associated with the other vehicle by predetermined communication.

10. The electric vehicle according to claim 9, wherein in response to permission of the information for requesting the power provision of the electric vehicle by a user associated with the electric vehicle, the electronic key is provided to the electronic device associated with the other vehicle by predetermined communication.

11. The electric vehicle according to claim 1, wherein the instructions, that when executed by the processor circuit, further cause the at least one processor circuit to at least:

measure an amount of power provided to the other vehicle using the charging port configured to provide the power, wherein the measured amount of power is provided to an electronic device outside the electric vehicle via a predetermined communication unit in order to charge a value corresponding to the provided power.

12. The electric vehicle according to claim 1, wherein the plurality of charging ports are formed by charging adapters of the same type.

13. A method for controlling an electric vehicle comprising a plurality of charging ports, at least one of which is configured to provide power to another vehicle, the method comprising:

authenticating an electronic device associated with the other vehicle using an electronic key; and controlling, in accordance with an authentication result in the authenticating, power provision to the other vehicle using the charging port configured to provide the power, wherein in a case where power is provided to the other vehicle using the charging port configured to provide the power, the controlling includes providing the other vehicle with at least part of power provided from an external charger to the electric vehicle.

14. A system comprising an electric vehicle and a charger configured to provide power to the electric vehicle, wherein the electric vehicle comprises:

a plurality of charging ports, at least one of which is configured to provide power to another vehicle; and at least one processor circuit with a memory comprising instructions, that when executed by the processor circuit, cause the at least one processor circuit to at least:

authenticate an electronic device associated with the other vehicle using an electronic key; and control, in accordance with an authentication result of the authentication unit, power provision to the other vehicle using the charging port configured to provide the power based on power provided from the charger to the electric vehicle, wherein in a case where power is provided to the other vehicle using the charging port configured to provide the power, the other vehicle is provided with at least part of power provided from an external charger to the electric vehicle.

15. An electric vehicle comprising:

a plurality of charging ports, at least one of which is configured to provide power to another vehicle; and at least one processor circuit with a memory comprising instructions, that when executed by the processor circuit, cause the at least one processor circuit to at least:

authenticate an electronic device associated with the other vehicle using an electronic key; and control, in accordance with an authentication result of the authentication unit, power provision to the other vehicle using the charging port configured to provide the power, wherein the plurality of charging ports are formed by charging adapters of the same type.

16. An electric vehicle comprising:

a plurality of charging ports, at least one of which is configured to provide power to another vehicle; and at least one processor circuit with a memory comprising instructions, that when executed by the processor circuit, cause the at least one processor circuit to at least:

control power provision to the other vehicle using the charging port configured to provide the power, wherein in a case where power is provided to the other vehicle using the charging port configured to provide the power, the other vehicle is provided with at least part of power provided from an external charger to the electric vehicle.

17. An electric vehicle comprising:

a plurality of charging ports, at least one of which is configured to provide power to another vehicle; and at least one processor circuit with a memory comprising instructions, that when executed by the processor circuit, cause the at least one processor circuit to at least control power provision to the other vehicle using the charging port configured to provide the power, wherein the plurality of charging ports are formed by charging adapters of the same type.

* * * * *